W. E. ANDREW.
PNEUMATIC TIRE.
APPLICATION FILED APR. 4, 1908.
1,008,772.
Patented Nov. 14, 1911.
2 SHEETS—SHEET 1.
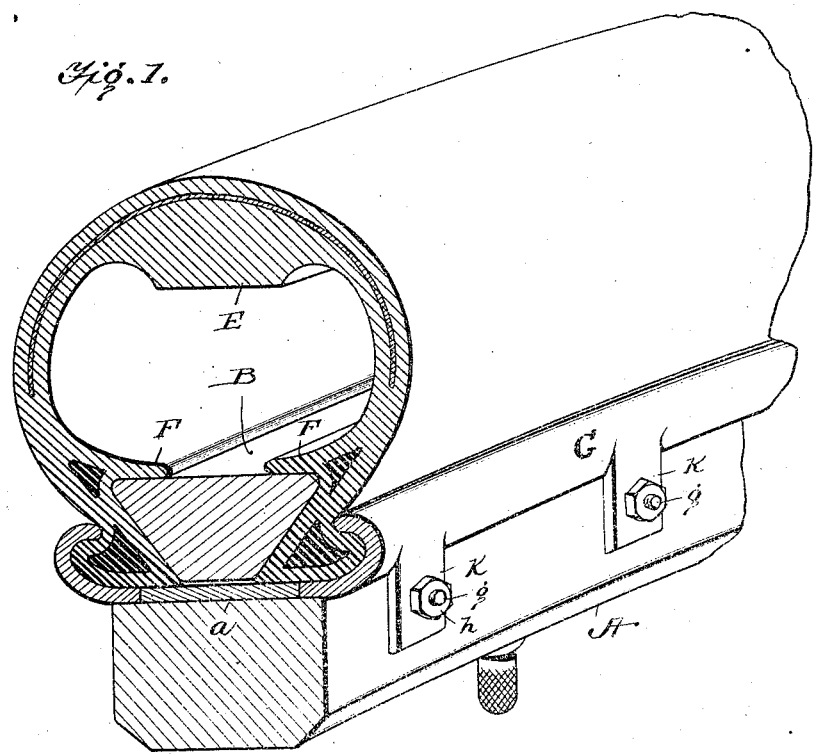
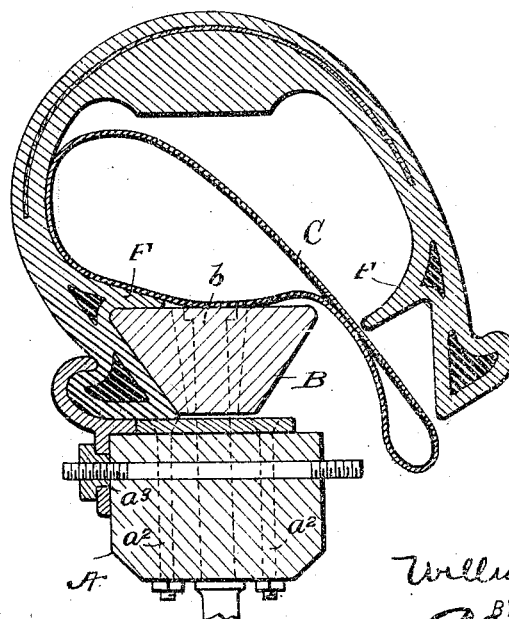
WITNESSES
INVENTOR
William E. Andrew
his ATTORNEY

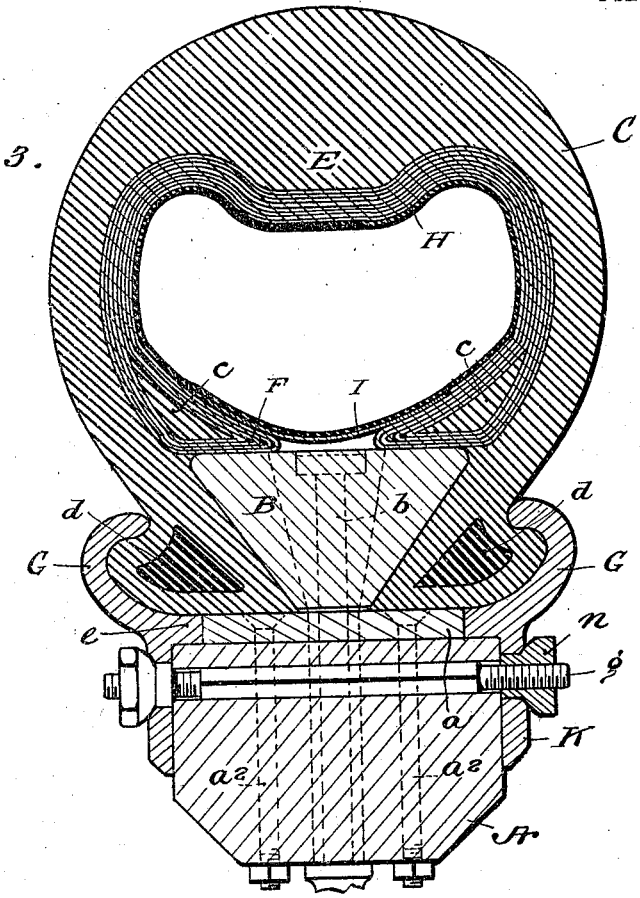

UNITED STATES PATENT OFFICE.

WILLIAM E. ANDREW, OF ATLANTIC HIGHLANDS, NEW JERSEY.

PNEUMATIC TIRE.

1,008,772.  Specification of Letters Patent.  Patented Nov. 14, 1911.

Application filed April 4, 1908. Serial No. 425,253.

*To all whom it may concern:*

Be it known that I, WILLIAM E. ANDREW, a citizen of the United States, residing at Atlantic Highlands, in the county of Monmouth and State of New Jersey, have invented certain new and useful Improvements in Pneumatic Tires; and I do hereby declare the following to be a full, clear, and exact description of the invention, such as will enable others skilled in the art to which it appertains to make and use the same.

My invention relates to improvements in pneumatic tires, and has for its object to provide a tire of the clencher type of improved form, together with novel instrumentalities for attaching and holding the tire in place on the rim of the wheel.

One of the objects of my invention is to afford means whereby the air-tube may readily be removed and replaced, when it is necessary to repair the same, all of which may be accomplished with the greatest ease.

Another object of my invention is to provide against rim-cutting and blowing out of the tire, the parts which effect this serving also to prevent sidewise deflation of the tire, and to give strength and durability to the parts.

Still a further object contemplated by my improvement is to prevent serious damage to the tire, owing to deflation of the air-tube, in the event that the same becomes punctured.

A further object contemplated by my improvement is to construct a tire and apply it to a wheel in such a manner that the pressure of the air within the air-tube will be confined above the clencher grooves of the shoe, and that the air-tube will bear equally upon inward-projecting bearings of the shoe thus removing the strain from the weak parts, at the clencher grooves, and transferring the yielding part of the tire more to the center and above the inward-projecting bearings of the shoe.

By my construction, embodying the several features above-mentioned, I can produce a tire which combines the resiliency and ready detachability of the ordinary pneumatic tire, with the strength and wearing qualities of a cushion or solid tire, a result which has not been attained in the art heretofore.

With these several objects and advantages in view, my invention in its preferred form, includes the novel construction and combination of parts hereinafter described in detail, and set forth in the annexed claims.

In the accompanying drawings, forming a part of this specification, and to be read in conjunction therewith, Figure I is a perspective view, partly in section, showing the rim of a wheel equipped with my improved form of pneumatic tire, and the means for attaching the same; Fig. II is a vertical sectional view of the rim and tire, the inner air-tube being shown partially removed, and with some slight modifications; Fig. III is a view similar to Fig. II, with all the parts secured in position.

Referring more particularly to the drawings, in which like characters of reference refer to corresponding parts in the several views, A designates the felly of a wheel, and $a$ is a metallic plate secured upon the felly by bolts $a^2$, or similar suitable attaching devices. A ring B is removably secured above the plate $a$ by means of bolts $b$, and constitutes a projection on the felly plate adapted to be engaged at its sides and top by flanges of the shoe C. The shoe C is provided interiorly with an inward projecting cylindrical abutment E arranged to move toward and engage the top of ring B, should the inner tube collapse, as a result of puncture. The abutment E thus forms a support for the shoe and by preventing further collapse, enables the tire to be used even though punctured, without causing serious damage.

F are flanges or overlapping projections formed on the inside of the shoe, and adapted to engage the top of ring B, as shown clearly in Fig. I. Embedded in the projections F are strips $c$ of any suitable hard but not necessarily non-yielding substances, giving strength and rigidity to the overlapping parts, and tending to hold the shoe in fixed position, especially when the strain is great as on turning a corner. The base-flanges of the shoe also have strips $d$ embedded therein, of hard but not necessarily non-yielding material, said base-flanges lying against the sides of ring B, and being held in place by the clamping or clencher rings G. By reason of the taper of the sides of ring B, the overlapping flanges or projections F, and the engagement of rings G with the base-flanges at points below the outer face of ring B, a perfect rigid fastening is obtained and a solid bearing is afforded for all of the coöperating parts, and in such a manner as to hold them tight, and at the same time protect them.

The clamping rings G are provided with inward-extending flanges e which engage the top of the felly, and retaining lugs K by which they are attached to the side of the felly, in any desirable way as by bolts g and nuts n. The bolts g before-mentioned are preferably squared through their body portion, as shown in Fig. III, the opening through the felly being correspondingly squared; and the nuts n, secured to said bolts g, are provided with curved faces to engage correspondingly curved depressions in the lugs K. By this construction, it will be seen that the nut need only be placed on the end of the bolt and turned, in order to draw the bolt through the felly, and secure the parts tightly, such result being obtained by the coöperation between the curved faces of the nuts and the similarly curved depressions in the clamping ring. In the construction shown in Fig. II, I omit the curved faces of the clamping ring and nuts, and employ in lieu thereof a nut having a collar $a^3$ adapted to be received by the opening in the clamping ring on one side, the usual form of nut being employed on the remaining side.

H is the inner air-tube having a canvas strip I upon its bottom face to engage and bear on the ring B and projections F.

It will be obvious that while I have shown my invention in a particular embodiment, various changes and modifications may be made without departing materially from the spirit and scope of my present improvement.

What I desire to secure by Letters-Patent, and claim, is:—

1. In a pneumatic tire, the combination with a wheel-felly, of a detachable outward-projecting portion surrounding the felly provided with tapering sides, a shoe embracing said tapering sides of the outward-projecting portion, flanges on the shoe extending over the top of said outward-projecting portion, strips of strengthening material embedded in the shoe adjacent to said flanges, and means for holding the shoe in position.

2. In a pneumatic tire, the combination with a wheel, of a detachable outward-projecting portion surrounding the wheel and provided with tapering sides, a shoe embracing said tapering sides of the outward projecting portion, flanges on the inner wall of the shoe extending over the top of said outward projecting portion, said shoe having a groove in its outer wall, and movable clamps engaging the aforesaid groove, said clamps bearing on the top of the felly and extending downward in contact with the sides of the felly, and bolts for securing the clamps to the felly.

In testimony whereof, I affix my signature, in the presence of two subscribing witnesses.

WILLIAM E. ANDREW.

Witnesses:
 JAMES P. HOPPING,
 AARON MOREHOUSE.